United States Patent [19]
Wittig

[11] Patent Number: 6,031,542
[45] Date of Patent: Feb. 29, 2000

[54] IMAGE PROCESSING METHOD AND ARRANGEMENT FOR THE DISPLAY OF REFLECTIVE OBJECTS

[75] Inventor: Oliver Wittig, Berlin, Germany

[73] Assignee: GMD - Forschungszentrum Informationstechnik GmbH, Germany

[21] Appl. No.: 08/799,305

[22] Filed: Feb. 11, 1997

[30] Foreign Application Priority Data

Feb. 12, 1996 [DE] Germany .................. 196 06 357

[51] Int. Cl.[7] ............................................. G06T 15/50
[52] U.S. Cl. ............................................. 345/426
[58] Field of Search ................................ 345/418, 426

[56] References Cited

U.S. PATENT DOCUMENTS

| | | |
|---|---|---|
| 4,709,231 | 11/1987 | Sakaibara et al. . |
| 4,866,637 | 9/1989 | Gonzalez-Lopez et al. . |
| 5,253,339 | 10/1993 | Wells et al. . |
| 5,357,599 | 10/1994 | Luken . |
| 5,561,746 | 10/1996 | Murata et al. ............... 345/419 |
| 5,734,385 | 3/1998 | Mima ............... 345/426 |
| 5,739,820 | 4/1998 | Lyon ............... 345/426 |

FOREIGN PATENT DOCUMENTS

| | | |
|---|---|---|
| 0580020A2 | 1/1994 | European Pat. Off. . |
| 0610004A2 | 8/1994 | European Pat. Off. . |

OTHER PUBLICATIONS

Fellner, W.D.: *Computergrafik*, BI, Wissenschafts–verlag, Mannheim, Leipzig, Wien, Zürich, 1992, ISBN 3–411–15122–6, pp. 299–313.

Ernst, I. et al; "Hardware Supported Bump Mapping . . . "; Maastricht, Netherlands, 1995, pp. 63–70.

N. Greene, "Environment Mapping and Other Applications of World Projections", IEEE Computer Graphics and Applications, New York Institute of Technology, Nov. 1986, pp. 21–29.

"Painting Environment Maps through Reverse Ray–Tracing", IBM Technical, Disclosure Bulletin, Sep.1991, p. 436–437, vol. 34, No. 4B.

*Primary Examiner*—Mark R. Powell
*Assistant Examiner*—Motilewa Good-Johnson
*Attorney, Agent, or Firm*—Venable; George H. Spencer; Robert Kinberg

[57] ABSTRACT

An image processing method and apparatus is provided for displaying objects composed of at least one polygonal surface. The spatial position of the planar normal ($n_x$, $n_y$, $n_z$) is determined for each object. The image perception of the polygonal plane seen by a viewer is calculated from the planar normal and from a predetermined virtual viewer location by providing a storage matrix that reproduces a cubical enveloping surface surrounding the respective object, and displays an all-around picture from the perspective of the object that is assigned to each object for taking into account the reflections of the environment and other objects within the framework of the local illumination model.

19 Claims, 9 Drawing Sheets

IMAGE PROCESSING METHOD AND ARRANGEMENT FOR THE DISPLAY OF REFLECTIVE OBJECTS

BACKGROUND OF THE INVENTION

The invention concerns an image processing method for displaying objects with reflective surfaces, wherein each object is composed of at least one polygonal plane represented by a first parameter set that represents the spatial position of the polygonal plane, and including the steps of: calculating, from the first parameter set for each object, a second parameter set ($n_x$, $n_y$, $n_z$) representing the spatial position of a planar normal of the polygonal plane; and calculating, from the second parameter set and a third parameter set ($e_x$, $e_y$, $e_z$) representing a perspective of a predetermined viewer of the polygonal plane, a fourth parameter set representing a spatial position of a light ray reaching the viewer after being reflected at the polygonal plane.

The invention further relates to an image processing arrangement for displaying objects, wherein each object is composed of at least one polygonal plane represented by a first parameter set that represents the spatial position of the polygonal plane, including: means for calculating, from the first parameter set for each object, a second parameter set ($n_x$, $n_y$, $n_z$) representing a spatial position of a planar normal of the polygonal plane; and means for calculating, from the second parameter set and a predetermined third parameter set ($e_x$, $e_y$, $e_z$) representing a perspective of a viewer of the polygonal plane, a fourth parameter set representing a spatial position of a light ray reaching the viewer after being reflected at the polygonal plane.

In computer graphics systems, bodies are generally reproduced with grid models, which are described by the space coordinates of nodal points of polygonal planes. In order to display the polygonal planes between the nodal points on a screen, the space coordinates for the nodal points are then converted from a 3-dimensional coordinate system, for example through central projection, to a 2-dimensional screen coordinate system.

Such an image processing method is known from ERNST, JACKEL, RÜSSELER, WITTIG: "Hardware Supported Bump Mapping: A Step towards Higher Quality Real-time Rendering," 10$^{th}$ Eurographics Workshop on Graphics Hardware, Maastricht, Netherlands, 1995, 63–70. With this method, the brightness and color perception of the individual polygonal planes located between the nodal points of the grid model are calculated separately for each polygonal plane, by taking into consideration the angle of incidence of the light and the viewing direction of the viewer corresponding to a local illumination model. This method can take into account diffuse reflection and specular reflection at the polygonal plane.

When viewing an ideally reflecting surface, the viewer does not see the polygonal plane itself, but the environment around the object to be displayed, which is reflected in the polygonal plane. With the known image processing method, the intersecting point between a "visual ray," originating from the viewer and reflected at the polygonal plane, and a cubical enveloping surface that surrounds the spatial setting to be displayed is used to calculate the brightness and color perception developing as a result of the specular reflections at the polygonal plane. In this case, a brightness and color value is assigned to each element of the enveloping surface, so that the enveloping surface comprises an all-around picture of the environment from the perspective of the object to be displayed. In order to calculate the brightness and color perception of a polygonal plane of the grid model, it is only necessary to calculate the point of intersection for the "visual ray" reflected at the polygonal plane and the cubical enveloping surface, and to subsequently determine the brightness and color value corresponding with this point of intersection. The cubical enveloping surface in this case is reproduced with a storage matrix, which is addressed by the components of the "visual ray" present in vector form in order to determine the point of intersection of the "visual ray" and the enveloping surface. Each memory location of the storage matrix comprises the brightness and color value of a dihedral angle sector of the environment around the object to be displayed.

Thus, the determination of the brightness and color value occurring as a result of the specular reflection at the polygonal plane requires only several vector operations for calculating the point of intersection between "visual ray" and enveloping surface and a memory access to the storage matrix that reproduces the enveloping surface. The already known image processing method thus permits a relatively fast calculation of the image perception, which is important especially for a real-time rendering of movement displays.

The known image processing method has one disadvantage, however, in that only reflections of the "global" environment in the objects can be displayed, but not the reflections of interrelated objects among one another ("interreflections"). It is also not possible with the known image processing methods to display multiple reflections of the interrelated objects.

SUMMARY OF THE INVENTION

Thus, it is an object of the invention to provide an image processing method of the aforementioned type, which permits the display of reflections of the environment in the objects and reflections of the objects among each other.

The above and other objects are accomplished in the context of the method first described above by the additional steps of: determining at least one of brightness and color perception of an object, taking into consideration reflections of the environment and other objects, by coordinating one 3-dimensional storage matrix for diffuse reflection with each object that represents an enveloping surface surrounding the respective object and includes image information values representing at least one of brightness and color perception of the environment surrounding the object from a perspective of the object and caused by diffuse reflection, and one 3-dimensional storage matrix for diffuse reflection with each object that represents an enveloping surface surrounding the respective object and includes image information values representing at least one of brightness and color perception of the environment surrounding the object from a perspective of the object and caused by specular reflection; selecting the 3-dimensional matrices for diffuse reflection and specular reflection coordinated with an object in dependence of a selection value calculated from the first parameter set that represents the spatial position of the polygonal plane; and addressing the selected storage matrices using the fourth parameter set for reading out the image information values from the selected storage matrices.

The above and other objects are further accomplished by the provision of an image processing arrangement of the type first described above which further includes: a first plurality of 3-dimensional storage matrices, each matrix of the first plurality representing an enveloping surface surrounding a respective one of the objects and including image information values representing at least one of brightness and color perception of the environment surrounding the object from a perspective of the object and caused by diffuse reflection; a second plurality of 3-dimensional storage matrices, each matrix of the second plurality representing an enveloping surface surrounding a respective one of the objects and including image information values representing at least one of brightness and color perception of the environment surrounding the object from a perspective of the object and caused by specular reflection; means for selecting the 3-dimensional matrices for diffuse reflection and for specular reflection assigned to an object in dependence of a selection value calculated from the first parameter set that represents the spatial position of the polygonal plane; and means for addressing the selected storage matrices using the fourth parameter set for reading out the image information values from the selected storage matrices.

The invention includes the technical teaching that for the display of a computer-modeled spatial setting, comprised of a plurality of objects with reflecting surfaces, storage matrices for diffuse and specular reflection are provided for each object, which matrices each reproduce an enveloping surface surrounding the respective object and that the content of the storage matrices is precalculated by taking into account the interreflections among the objects, for example with the known Ray-Tracing Method.

The image processing method according to the invention permits the display of spatial settings with a plurality of objects, which are present in the form of a grid model and are preferably defined through the space coordinates of the individual corner points and thus the position in space of the individual polygonal planes.

The image perception of the individual polygonal planes can in this case be calculated independently, which permits a realization of the image processing method according to the invention in parallel computer system architecture and thus allows a fast image calculation. As already mentioned above, this is particularly advantageous for a real-time rendering of movement displays or the simulation of varying light conditions.

The inventive measures can be implemented strictly with software measures as well as with suitable, specialized hard-ware. A hardware solution in this case has the advantage of permitting great time savings, in particular with simultaneously performed operations in parallel-arranged modules.

Thus, references to "modules" in the following, can also refer to functional groups, for example in the form of electrical circuits. This also means that one and the same module or functional group can successively perform different operations, such as is generally the case for processor technology. As previously explained, however, speed advantages can be achieved if functional groups operate side-by-side, in a parallel arrangement.

According to the invention, the image perception is calculated with an arithmetic unit, which has a first module for taking up a first parameter set that represents the spatial position of the polygonal plane to be displayed. For this, the first parameter set contains, for example, the space coordinate values of the corner points for the polygon to be displayed or the space coordinate values for the plane gravity center as well as the normal vector components for the polygonal plane. It is only important for the composition of the first parameter set that it clearly represent the spatial position of the polygonal plane.

The first module of the arithmetic unit then uses the first parameter set to calculate a second parameter set that represents the planar normal for the polygonal plane in order to be able to take into account the orientation of this polygonal plane relative to the light sources or the viewer, when calculating the image perception of the polygonal plane within the framework of a local illumination model.

The position in space of the planar normal for the polygonal plane can be determined from the space coordinates for the corner points of the polygonal plane. For this, the border vectors of the polygonal plane are, for example, calculated by subtracting the space coordinates of neighboring corner points by components. The border vectors determined in this way naturally lie in the plane defined by the polygonal plane. The planar normal then results from the vector product of two border vectors.

When viewing an ideally reflecting surface, the viewer, as already mentioned above, does not see the observed polygonal plane itself, but the area surrounding it, which is reflected by the polygonal plane. The light hitting the polygonal plane is reflected in accordance with the laws of geometrical optics, wherein angle of incidence and angle of reflection are the same. If, on the other hand, one does not look at the light ray emitted by a source, but reversely at a "visual ray" originating with the viewer, then this "visual ray" is reflected at the polygonal plane in the direction of a reflection vector. The spatial position of this reflection vector results from the laws of geometrical optics—the angle of incidence equals the angle of reflection. Thus, the point of intersection of the reflection vector with another object in the spatial setting or the background is critical for the image perception when viewing a reflecting surface. The arithmetic unit according to the invention therefore has a second module to calculate a fourth parameter, from the second parameter set representing the position of the normal vector of the polygonal plane and from a third parameter set representing the perspective of the viewer, representing the position in space of the reflection vector. It is preferable if the third parameter set here comprises the space coordinate values of a virtual viewer location or the components of a vector representing the visual direction. By varying these space coordinate values, it is possible in a simple way to change the perspective and to walk through the spatial setting.

The point of intersection of the reflection vector with the environment or another object is critical for the image perception of a reflecting surface, as already mentioned in the above. However, the determination of this intersecting point is relatively difficult, especially for spatial settings with large dimensions. The image processing method according to the invention thus provides that each object in the spatial setting be surrounded by a preferably cubical enveloping surface and that the point of intersection of the reflection vector with this enveloping surface be determined. To accomplish this, a brightness or color value is assigned to each surface element of the enveloping surface, wherein the distribution of the brightness or color values over the enveloping surface is precalculated by mapping the environment surrounding the object onto the enveloping surface. This can take place, for example, through central projection of the environment onto the enveloping surface, which thus displays an all-around picture of the environment for the respective object. In order to calculate the image perception of the polygonal plane, the point of interception of the reflection vector with the enveloping surface is therefore calculated according to the invention, and the brightness and/or color value coordinated with this point of the enveloping surface is determined.

In this case, the enveloping surface is reproduced with a storage matrix, wherein each memory location in the storage matrix corresponds to a surface element of the enveloping surface. In accordance with the invention, the calculation of the intersecting point for the reflection vector and the enveloping surface as well as the determination of the associated brightness and/or color value are preferably carried out with an addressing unit, which calculates from the components of the reflection vector the address values that are necessary to address the memory location in the storage matrix that is coordinated with the intersecting point for the reflection vector and the enveloping surface.

The determination of the brightness and/or color value occurring as a result of specular reflection at the polygonal plane requires only a few vector operations in order to calculate the intersecting point for the reflection vector and the enveloping surface as well as a memory access to the storage matrix, which reproduces the enveloping surface. This has the advantage of permitting a relatively fast calculation of the image perception, which is particularly important for the real-time rendering of movement displays or for the simulation of varying light conditions.

In accordance with the invention, several such storage matrices are provided, which are respectively assigned to each object of the spatial setting to be displayed so that the interreflections of the objects among each other can be taken into consideration.

It is important in this connection that the storage matrix used to determine the image perception for a polygonal plane, is the one assigned to the respective object. In accordance with the invention, a third module is provided for this, which calculates a selection value from the first parameter set representing the spatial position of the polygonal plane and which selects a storage matrix depending on the selection value. In a simple embodiment, the selection value is calculated by making a comparison of the space coordinate values for the polygonal plane with predetermined limit values, which correspond to the position in space of the side surfaces of the cubical enveloping surface.

It is important in this case that the storage matrices each comprise an all-around picture of the environment of the respective object. To be sure, the calculation of the corresponding memory contents is relatively time-consuming, but must be performed only once, insofar as the arrangement of the objects within the setting to be displayed is not changed. Thus, it makes sense to precalculate the "environmental images" stored in the storage matrices in order to save calculation time during the actual display of the spatial setting.

When calculating the content of the storage matrices, it is possible in a simple way to take into account multiple interreflections of the objects among each other. For this, the content of the associated storage matrix is initially determined in a first pass for each object, wherein only the simple interreflections of the objects among each other can be considered. Subsequently, the storage matrices then receive the environmental images of the individual objects, taking into account simple interreflections, so that during an additional pass, the content of the storage matrices can be calculated by taking into consideration the dual reflections as well. Thus, it is possible to precalculate reflections at an optional depth through multiple passes when calculating the storage matrices.

In the above-described embodiments of the image processing method according to the invention, the image perception is calculated by considering the planar normal for the total polygonal plane.

In contrast, in one preferred embodiment of the invention the polygonal planes are respectively divided into a plurality of grid elements, which makes it possible among other things to take into account the varying lighting conditions within the polygonal plane. For this, the first module of the arithmetic unit calculates a plurality of coordinate sets from the first parameter set representing the spatial position of the polygonal plane, which coordinate sets represent the position of one each grid element of the polygonal plane and comprise, for example, the space coordinate values for the individual grid elements.

In addition, the division of the polygonal planes into grid elements makes it possible to take into account the fact that the local planar normal varies within the polygonal plane if the polygonal planes are curved. For this, the local planar normals for curved polygonal planes at the corner points of the polygonal plane are predetermined by the parameter set received at the input of the arrangement. The local planar normal at a selected point of the polygonal plane then results from interpolation of the corner point normals.

In addition, predetermining the corner point normals ensures a "soft" transition between neighboring polygonal planes because one corner point normal respectively belongs to several neighboring polygonal planes and the surface at the connecting line between neighboring polygonal planes is therefore smooth.

For interpolation of the local planar normal for the curved polygonal plane from the corner point normals, a normal vector representing an intermediate position is determined dependent on the position of the grid element to be viewed between the corner points of the polygonal planes and on the corner point normals. When viewing an interpolation between only two corner point normals, that is, on a line connecting the two corner points, one of the corner point normals can be mapped onto the other corner point normal through a displacement and a rotation. One problem for the interpolation of the local planar normal is that the mapping through displacement and rotation cannot simply be done through interpolation by components.

For one advantageous embodiment of the invention, so-called quaternions are therefore used for the interpolation of the local planar normal. Quaternions are four-dimensional vector operators, which have one scalar component and three vector components. One quaternion is preset for each corner point normal. The interpolation of a selected local planar normal can be done advantageously through interpolation using components of the quaternions. If, for example, the local planar normal in the center between two corner points must be calculated and if the interpolation takes place only with the aid of these two corner points, then the quaternion for this local planar normal must first be determined, which in this case results in the median value for the quaternions predetermined for the two corner point normals. The local planar normal is then obtained when linking one corner point normal with the calculated quaternion.

For the aforementioned embodiments of the image processing method according to the invention, ideally reflecting surfaces were assumed for calculating the image perception of the polygonal planes, so that the color distribution of the polygonal planes itself does not influence the image perception because the viewer does not perceive the polygonal plane itself, but the environment mirrored in the polygonal plane. However, the reflection of incident light on real surfaces is only partially specular and in part diffuse, so that the color or brightness of the polygonal plane has an essential influence on the image perception. For such an only partially reflecting surface the image perception therefore is composed of the color or brightness of the polygonal plane and the reflections of the environment. In one preferred embodiment of the method according to the invention, it is therefore provided that each polygonal plane be assigned a color or brightness value and this value be merged with the image information value that represents the reflection of the environment in the polygonal plane. The merging ratio here is set according to the ratio of specular reflection to diffuse reflection, wherein the image information value that represents the reflections in the polygonal plane is weighted more with increasing share of the specular reflection.

For one preferred embodiment of the image processing method according to the invention, it is provided that a two-dimensional texture image that reproduces the surface structure of natural surfaces be superimposed respectively on the individual polygonal planes. In this way, it is possible, for example, to reproduce the surface structure of a wood grain without having to refine the grid model correspondingly. For this, each grid element of the polygonal plane is assigned a value for the texture image, which is then merged, as described in the above, with the image information value that represents the reflections of the environment. It is important here that the value for the texture image depends only on the position of the grid element within the polygonal plane, but not on the position in space of the polygonal plane. Otherwise, the texture image would "migrate" within the polygonal plane if the polygonal plane moves. In accordance with the invention, the texture image is stored in a storage matrix, in the following also called a texture memory, that is addressed by an addressing unit with the coordinate set representing the spatial position of the individual grid elements.

Another, modifying variation of the invention provides that a depth structure be superimposed onto the individual polygonal planes, which are level or at least smooth, in order to produce a realistic image perception and to permit the simulation of structured surfaces, without having to reproduce the details of the surface structure in the grid model. As for the superimposition of a two-dimensional texture image, the precondition here is the division of the individual polygonal planes into grid elements and the calculation of the local planar normal individually for each grid element of the polygonal plane from the planar normal, without considering the depth structure, and calculation for each grid element of a tilt value that represents the deflection of the local planar normal on the basis of the depth structure.

A storage matrix is therefore provided, which in the following is also called a depth matrix, and comprises for a preset depth structure the tilt values of the local planar normal that result from the surface pattern. Each element of the depth matrix is therefore assigned to a point of the depth structure and comprises the tilt value for this point in the depth structure. The tilt vector, for example, can be stored as the tilt value, meaning the vector that must be added to the local planar normal for the smooth surface to produce the impression of a depth structure. It is also possible to store a rotation matrix as a tilt value, which defines the rotation of the local planar normal. This is particularly advantageous because the length of a local planar normal is not changed by a rotation.

It is important in this connection that the depth structure itself is not stored as relief in the depth matrix, but the tilt of the local planar normal resulting from the surface pattern. The calculation of the local planar normal tilted as a result of the depth structure can therefore be made relatively fast and with a small calculation expenditure.

Thus, a tilt value is read out of the depth matrix for each grid element, which represents the tilt caused by the depth structure of the local planar normal for this grid element. The depth matrix is therefore addressed with the coordinate set for the respective grid element.

It is important in this connection that the depth value depends exclusively on the position of the grid element within the polygonal plane, but not on the global position of the grid element or the position in space of the polygonal plane. This is necessary because otherwise the depth structure appearing on the polygonal plane would "migrate" on the surface with a movement of the polygon.

If the tilt for the local planar normal resulting from the depth structure is oriented based on the planar normal for the total polygonal plane, then a depth structure can be simulated correctly only on level polygonal planes because the planar normal within the polygonal plane is uniform only for such polygonal planes. For curved polygonal planes on the other hand, the planar normal varies within the polygonal plane. The tilt for the local planar normal resulting from the depth structure must therefore not be oriented based on the planar normal for the total polygonal plane, but must initially be calculated for all grid elements, as already described in the above to take into account a curved polygonal plane.

One modification of the invention provides that the tilt value that reproduces the surface pattern of the depth structure to be simulated is multiplied with a scaling factor in order to change the spatial depth of the surface structure. The depth matrix in this case contains the maximum tilt values for the local planar normal as opposed to the planar normal for the smooth surface. These maximum tilt values are then reduced in accordance with the scaling factor to simulate a depth structure with selectively adjustable spatial depth. A dynamic simulation of depth structures with changeable spatial depth is also possible in this way. This only requires changing the scaling factor during the display.

For the above-described modification of the image processing method according to the invention, the depth structure is simulated for the display of an object by tilting the local planar normal in accordance with the surface of the depth structure to be simulated. The local planar normal tilted in this way is then taken into account, as described above, within the framework of a local illumination model for calculating the brightness or color perception of the respective grid element.

By contrast, another modification of the image processing method according to the invention provides for a simulation of the depth structure of the object surface during the calculation of the 3-dimensional storage matrices which reproduce the enveloping surfaces. The content of the storage matrices that reproduce the enveloping surfaces here is calculated by taking into account a depth-structured surface. As mentioned in the above, the storage matrices can be calculated with the Ray-Tracing Method. A "visual ray" is observed in this case, which originates with a virtual viewer and is reflected at the grid elements of the object surface. The object or detail of the environment intersected by the hereby developing reflection vector then defines the image perception of the reflecting element. In order to simulate a depth structure it is then only necessary to use a grid element that is tilted according to the surface patterns of the depth structure to be simulated as the basis for the calculation of the reflection vector from the "visual ray." Thus, for this modification of the image processing method according to the invention, the calculation expenditure for simulating a depth structure arises only for the precalculation of the storage matrices. This results in an advantageous savings in calculation time during the display of the spatial setting, which is particularly important for a real-time rendering of motion sequences.

As already explained in detail, the aforementioned image processing method according to the invention provides a storage matrix for each object, which reproduces an enveloping surface surrounding the object and comprises an all-around picture of the environment from the perspective of the object. In the above-described modifications of the invention, however, the content of this storage matrix is static, so that the spatial setting to be displayed is also static. It is possible to change the virtual location of the viewer and thus migrate through the setting, although the setting itself does not change in this case.

For one advantageous modification of the invention, it is therefore provided that the environment of the individual objects be simulated dynamically. This is of advantage, for example, if a reddish glow or falling rain drops as background image are to be displayed.

This can be done, for example, by continuously recalculating the content of the storage matrices corresponding to the animation to be simulated, wherein the respective, actually displayed image of the background is taken into account.

For cyclical movements or motion sequences that are repeated in the background picture, on the other hand, it is advantageous to provide several storage matrices for each object, each of which reproduces a snapshot of the movement. In order to generate the impression of movement, it is then only necessary to switch between the individual storage matrices. It is possible here to precalculate the content of the storage matrices, so that it is only necessary to switch between the different storage matrices during the actual display of the spatial setting. This saves calculating time during the display of the spatial setting, which is advantageous for a real-time rendering of motion sequences.

Besides the dynamic simulation of the respective local environments for the individual objects, it is also possible to simulate dynamically the textures, meaning the two-dimensional surface structures to be simulated. It is possible in this way to simulate a surface structure, for example, which varies in time when displaying objects. As for the dynamic simulation of the environment described in the above, this can be achieved by providing several storage matrices for storing the texture image, wherein each storage matrix comprises one snapshot each of the texture image to be simulated. During the display of the object, it is then only necessary to switch between the individual storage matrices to achieve the perception of a movement.

Since the texture memory as a rule comprises only the texture image to be superimposed on the surface, it is advantageously possible to use the refresh memory of a video or computer graphics system as texture memory or to link the texture memory in other ways with such a system. For the display of computer-modeled surfaces with the aid of traditional graphics systems, this allows the dynamic simulation of optional picture sequences on the surface as surface structure image.

For the dynamic simulation of changeable dimensions for environment or object, it is also possible to animate the texture memory, the depth structure memory or the storage matrices, which reproduce the environment for the individual objects. These different animation options can be used by themselves or in any combination to achieve interesting optical effects.

As previously explained in detail, the image processing method according to the invention provides storage matrices, which are always associated with an object and reproduce an enveloping surface that surrounds the object, wherein the enveloping surface reproduces an all-around picture from the perspective of the respective object and thus permits taking into account reflections when calculating the image perception. A color or brightness value is therefore coordinated with each surface element of the enveloping surface, which reproduces the image effect of the environment from a specific perspective of the viewer.

Thus, the position of the viewer determines which side of the enveloping surface reproduces the image perception of the environment. For an interpolation of the color or brightness values read out of the storage matrix this can cause problems because the neighboring surface elements for the enveloping surface, which may possibly belong to different side surfaces of the enveloping surface, must each be addressed for this. Since the individual side surfaces of the enveloping surface are stored successively in the storage matrix, in separate memory areas, this may lead to incorrect addressing. It is therefore advantageous if the data for a complete side surface as well as the border information for the neighboring side surfaces are stored respectively in each memory area of the storage matrix to permit an interpolation of the brightness or color values read out of the storage matrix.

The body or area that is to be displayed on the screen, is reproduced in the computer as a grid model, as already described in the above. The surface therefore comprises a plurality of polygonal planes, for which the spatial position is defined by the space coordinates of the nodal points for the grid model. For one advantageous embodiment of the invention triangles are used as polygonal planes. This means that in the grid model three points are always linked by borders. The use of triangles for modeling the surfaces has the advantage that the planar normal of a triangle is clearly defined by the space coordinates of the corner points because three points are always located in one plane while for polygons with more than three corner points, it is possible that the corner points are not located exactly in one plane, so that the planar normal is also not precisely defined.

The method described in the above is not limited to a monochrome display. Rather, this method can be implemented successively or parallel for several colors, preferably the basic colors. A color-dependent reflection or absorption behavior of the surface can also be taken into account with this.

For one advantageous modification of the invention, the arrangement is designed as an independent processor, which takes up a parameter set at its input that determines, among other things, the spatial position of a polygonal plane. The spatial coordinates of individual grid elements of the polygonal plane as well as the brightness value for the grid elements are then subsequently issued at the output by taking into consideration the specular reflections of the environment. The space coordinates of the individual grid elements must then simply be transformed in the conventional way to a 2-dimensional screen coordinate system to display the polygonal plane on the screen. The circuit can thus be favorably integrated into existing computer graphics systems.

Other advantageous modifications of the invention are characterized in the dependent claims or are shown in more detail in the following, together with the description of the preferred embodiment of the invention.

DETAILED DESCRIPTION OF THE INVENTION

Figure 1:
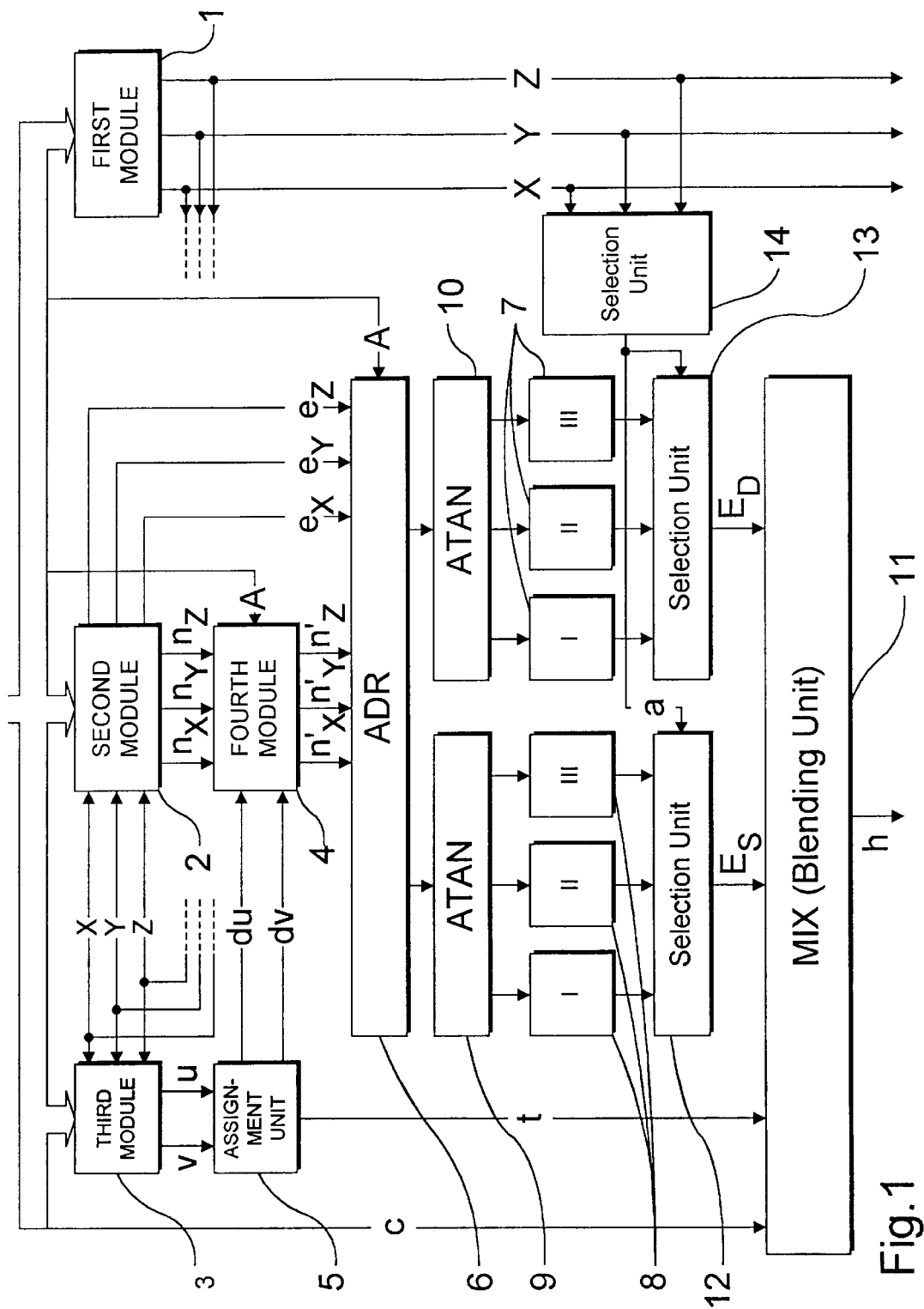
FIG. 1 is a block diagram of an exemplary embodiment of the invention for displaying computer-modeled objects.

Referring to FIG. 1 there is shown a block diagram of a circuit used for the graphic display of objects or planes that are present in the form of a grid model. The surface of an object to be displayed is simulated, in this example, by a plurality of adjoining triangles, for which the spatial position is defined by the spatial coordinates of the nodal points in the grid model.

For the display of several objects with reflecting surfaces, this circuit advantageously permits taking into account the reflections of the environment in the objects as well as the interreflections of the objects among each other. In the embodiment described herein, the display of a maximum of three objects with reflecting surfaces is possible. This limitation, however, is based exclusively on the illustrated embodiment of the circuit that is simplified for reasons of clarity, and is not a basic limitation of the invention as will be explained later on. The circuit also permits the simulation of a depth structure, for example a surface roughness, without having to reproduce the depth structure in the grid model, which permits realistic displays even with relatively simple grid models. This is accomplished according to one aspect of the invention in that a two-dimensional image of a surface structure can be superimposed, respectively, on the individual triangles, which permits the simulation of a characteristic color or brightness distribution of the surface. Here too, the grid model does not have to be refined correspondingly, which has the advantage of saving calculation time during the display.

The circuit receives for each triangle a parameter set as an input value, which set defines the spatial position of the triangle as well as the desired material qualities of the surface. The input parameter set comprises the spatial coordinates $(x_s, y_s, z_s)$ of the corner points for the triangle, the border increments $\Delta lu$, $\Delta ru$, $\Delta ld$, $\Delta rd$, the number of grid lines $n_1$, $n_2$ of the triangle, as well as the tilt $\Delta zx$ of the triangle plane toward the X-axis and the tilt $\Delta zy$ of the triangle plane toward the Y-axis. (See FIGS. 5a, 5b.) In addition, the input parameter set comprises data on the color of the triangle plane, the absorption behavior, the transparency of the triangle plane and similar information. The input parameter set furthermore comprises a U, V coordinate pair for each corner point of the triangle, which defines the position of the respective corner point in the depth structure.

Thus, the input parameter set associates a point in the depth structure with each corner point of the triangle.

The data for the input parameter set that define the spatial position of the triangle are fed to a first module 1, which initially divides the triangle plane into numerous parallel grid lines and each grid line again into numerous grid elements. Subsequently, the space coordinates x, y, z are calculated for each grid element. The division of a triangle into grid elements and the calculation of the space coordinates for the individual grid elements is explained in detail in the description of FIGS. 5a and 5b.

The input parameter set present at the circuit input is additionally fed to a second module 2, which calculates the planar normal $(n_x, n_y, n_z)^T$ for the triangle plane. In addition, the second module 2 calculates, from a predetermined position of the viewer and the position $(x_s, y_s, z_s)$ of the triangle, the viewing vector $(e_x, e_y, e_z)^T$ and the viewing direction of the viewer.

The input parameter set is furthermore fed to a third module 3, which interpolates the u, v coordinates for the individual grid elements from the U, V coordinates for the corner points of the triangle. Thus, for each grid element the associated point in the depth structure is calculated.

Furthermore, a matrix M is calculated, which maps the space coordinates X, Y, Z of the individual grid elements onto the u, v coordinates of the respective grid elements, that is, the positions of the u, v coordinates within the depth structure to be simulated is:

$$\begin{bmatrix} u \\ v \end{bmatrix} = [x \ y \ z] \cdot \begin{bmatrix} M_{00} & M_{01} \\ M_{10} & M_{11} \\ M_{20} & M_{21} \end{bmatrix}$$

As already described above, the input parameter set comprises the U, V coordinates for each corner point of the triangle. Since the X, Y, Z coordinates of the three corner points are known, a system of equations, comprising six equations with a total of six unknowns $M_{ij}$ is given, which is solved in a simple way by using Cramer's Rule.

The matrix M is used to orient the depth structure parallel to the triangle plane and, as will be explained in more detail later on, for calculating another matrix, which orients the tilt vector resulting from the depth structure on the planar normal of the polygonal surface in order to calculate the spatial position of the local planar normal corresponding to the surface pattern of the depth structure.

The u, v coordinates obtained for each grid element in this way are fed to an assignment unit 5, which assigns to each value pair (u, v) a depth value (du, dv) that defines the depth structure of the surface and a texture value t, which defines the surface texture. The assignment unit 5 has two-dimensional storage matrices for this, the texture matrix and the depth matrix, which are respectively addressed with a u, v value pair.

The texture matrix defines a flat pattern, which is blended into the surface of the triangle. Each u, v value pair thus addresses an element of the texture matrix, which determines the brightness and/or color value for the associated grid element on the triangle surface. The brightness of the triangle plane is therefore not completely uniform, but can differ from grid element to grid element, depending on the pattern stored in the texture matrix. As a result of this, the surface does not appear to be completely uniform and thus appears to be more realistic. For example, it is possible to simulate the grain of a wood surface. It is important in this connection that the texture matrix comprises only the brightness and/or color distribution of the desired pattern, but does not simulate a depth structure. The surface of the triangle thus initially appears to be completely smooth.

The depth matrix functions to simulate a depth structure, that is an optional surface roughness. This depth matrix is addressed with the u, v value pair, the same way as the texture matrix. The depth matrix in this case comprises tilt values (du, dv), which reproduce the tilt of the local planar normal corresponding to the surface pattern of the depth structure to be simulated.

The orienting of the local planar normal in the various grid elements is decisive for the reproduction of the depth structure because the reflection behavior of the surface is determined by this. For that reason, the depth matrix defines how the planar normal is tilted at the individual grid elements within the depth pattern relative to the planar normal of the total pattern. The depth matrix therefore comprises a value du respectively, which determines the tilt of the local planar normal relative to the U-axis, as well as a value dv, which determines the tilt relative to the V-axis. Since each grid element is mapped onto a u, v value pair, the depth matrix thus defines the depth structure that is to be imprinted onto the triangle surface.

The circuit also has a fourth module 4, which calculates the local normal (also referred to herein as the "pixel" normal) from the planar normal $(n_x, n_y, n_z)^T$ for the polygonal plane and the local tilt values du and dv, meaning module 4 calculates the local planar normal $(n_x', n_y', n_z')$ at the location for each grid element.

Figure 4:
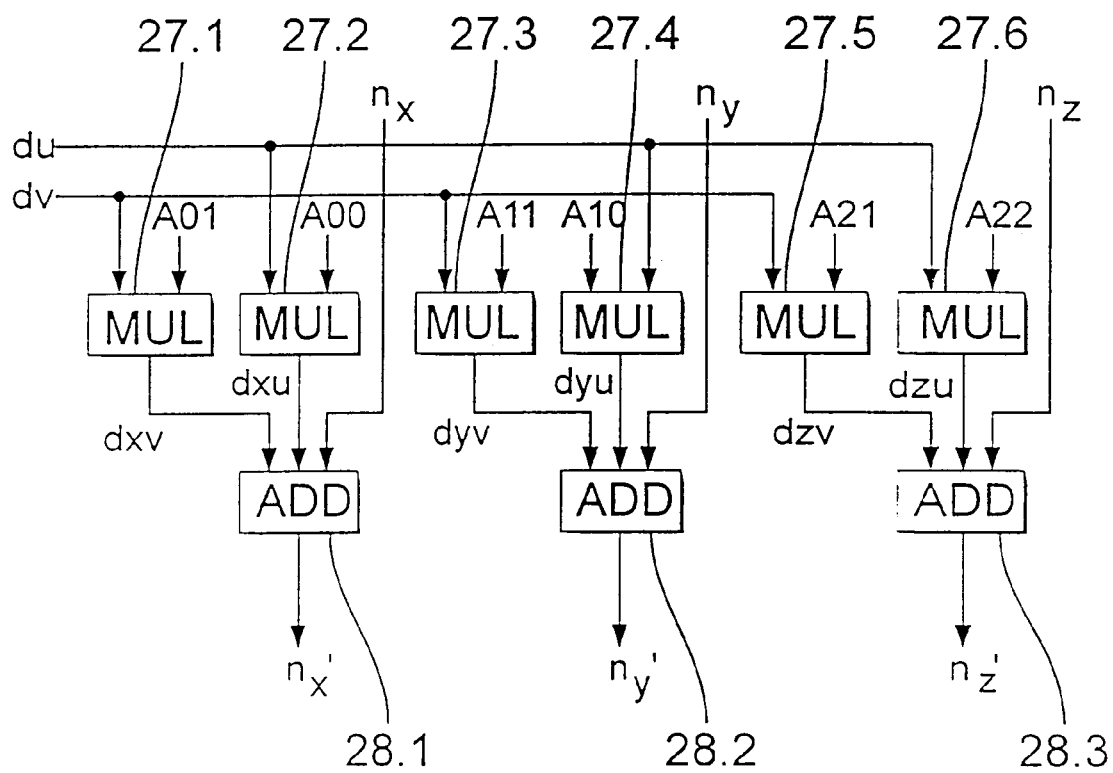
FIG. 4 is a detailed block circuit diagram of a module shown in FIG. 1.

As shown in the block circuit diagram of FIG. 4, the fourth module 4 multiplies the deviations du and dv with a mapping matrix A and adds these to the planar normal $(n_x, n_y, n_z)^T$:

$$\begin{bmatrix} n_x' \\ n_y' \\ n_z' \end{bmatrix} = \begin{bmatrix} n_x \\ n_y \\ n_z \end{bmatrix} + \begin{bmatrix} A_{00} & A_{01} \\ A_{10} & A_{11} \\ A_{20} & A_{21} \end{bmatrix} \cdot \begin{bmatrix} du \\ dv \end{bmatrix}$$

Thus, the grid elements of a triangle each have one tilted local planar normal, in the following called a pixel normal, corresponding to the depth structure stored in the depth matrix, so that the brightness of the grid elements can fluctuate within a triangle as a result of the angle-dependence of the reflection behavior. However, in contrast to the flat texture image also mapped onto the surface of the triangle, the brightness of a grid element not only depends on the position of the grid element within the triangle plane, but also on the position of the viewer and the light sources relative to the triangle plane. In case of a change of the viewer position, the depth structure perception changes correspondingly while the perception of the texture image remains unchanged.

The local brightness value is calculated with another module 6, that reads out the local brightness and/or color value from a 3-dimensional storage matrix 7, 8, depending on the position of the viewer, which is given by the viewing vector $(e_x, e_y, e_z)^T$ and the pixel normals $(n_x', n_y', n_z')$. As will be explained below, there is a 3-dimensional storage matrix 7 comprising brightness and/or color values for diffuse reflection for each of the three objects I, II, III in this example, and likewise a 3-dimensional storage matrix 8 comprising brightness and/or color values for specular reflection for each of the three objects I, II and III.

The storage matrices 7, 8 in this case reproduce cubical enveloping surfaces that respectively surround an object, wherein a brightness or color value is coordinated with each surface element. Thus, the enveloping surfaces reproduce an all-around picture from the perspective of the respective object and in this way permit a calculation of the image perception that develops when viewing reflecting object surfaces. In this case, it depends on the perspective of the viewer and the local planar normal of the observed grid element as to which surface element of an enveloping surface or which memory location of the associated 3-dimensional storage matrix contains the brightness or color value that is perceived by the viewer.

Since the positions of the individual objects within the spatial scene to be displayed vary and thus the environment that is reflected in an object has a different appearance for each object, storage matrices are assigned to each object, which reproduce an enveloping surface that surrounds the respective object. In this case, it depends on the position of the observed grid element as to which of the storage matrices 7, 8 are considered for calculating the color or brightness value. The storage matrices that must be considered in this case are the ones that reproduce the enveloping surface surrounding the respective grid element. For the selection of one pair of the storage matrices 7,8, corresponding to an object I, II or III, the space coordinates (x, y, z) of the grid element are supplied to a selection unit 14, which compares the coordinate values (x, y, z) of the observed grid element with the limit values for the various enveloping surfaces and generates a selection signal a, which determines the storage matrices that must be considered for calculating the color or brightness value. For the selection of a pair of specular and diffuse storage matrices corresponding to an object I, II or III, selection unit 12 is connected in series after the three storage matrices 8 for calculating the specular reflection, and selection unit 13 is connected in series after the three storage matrices 7 for calculating the diffuse reflection. Selection units 12 and 13 are connected to the selection unit 14, and depending on the selection value a of the output signal of selection unit 14, a pair of storage matrices 7, 8 corresponding to one of the objects I, II or III is selected.

It is necessary to differentiate between diffuse and specular reflection at the grid elements and to calculate these two types of reflection separately. As noted above, one 3-dimensional storage matrix 7 is provided for each object to calculate the color or brightness value for the diffuse reflection, and another 3-dimensional storage matrix 8 is provided for calculating the color or brightness value of the specular reflection.

For the diffuse reflection, it is assumed that the light is radiated uniformly in all directions, while for the specular reflection the radiation follows the laws of geometrical optics, wherein the angle of incidence and the angle of reflection are the same. If we now consider a light ray that does not originate with the light source, but reversely, a "visual ray" originating with the viewer, then this "visual ray" is reflected at the grid element in the direction of a reflection vector R (see FIG. 6b). The pixel normal $N_U$, the reflection vector R and the viewing direction E thus are located in one plane, wherein the angle between the pixel normal and the viewing direction equals the angle between the reflection vector and the pixel normal.

Thus the following applies for the reflection vector, depending on the pixel normal $N_U$ and the viewing direction or the "visual ray" E:

$$\vec{R} = 2 \cdot \vec{N}_U \cdot (\vec{N}_U \cdot \vec{E}) + \vec{E} \cdot (\vec{N}_U \cdot \vec{N}_U)$$

If written in the component manner of writing:

$$\begin{bmatrix} r_x \\ r_y \\ r_z \end{bmatrix} = 2 \cdot \begin{bmatrix} n'_x \\ n'_y \\ n'_z \end{bmatrix} \cdot (n'_x \cdot e_x + n'_y \cdot e_y + n'_z \cdot e_z) + \begin{bmatrix} e_x \\ e_y \\ e_z \end{bmatrix} \cdot (n'^2_x + n'^2_y + n'^2_z)$$

Figure 6A:
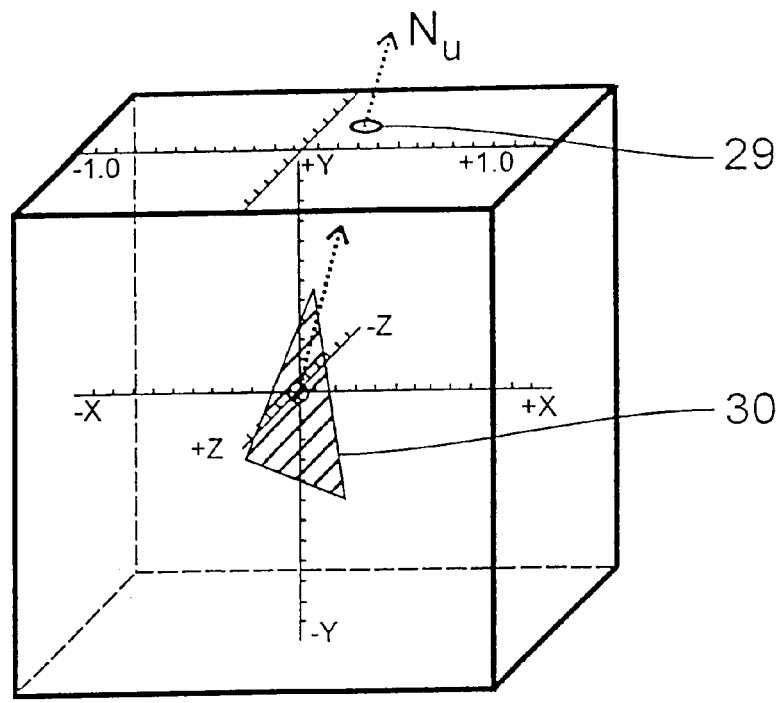
FIGS. 6a and 6b are diagrams showing triangular planes surrounded by cubical enveloping surfaces for explaining the calculation of the color or brightness value with diffuse reflection and specular reflection, respectively.
Figure 6B:
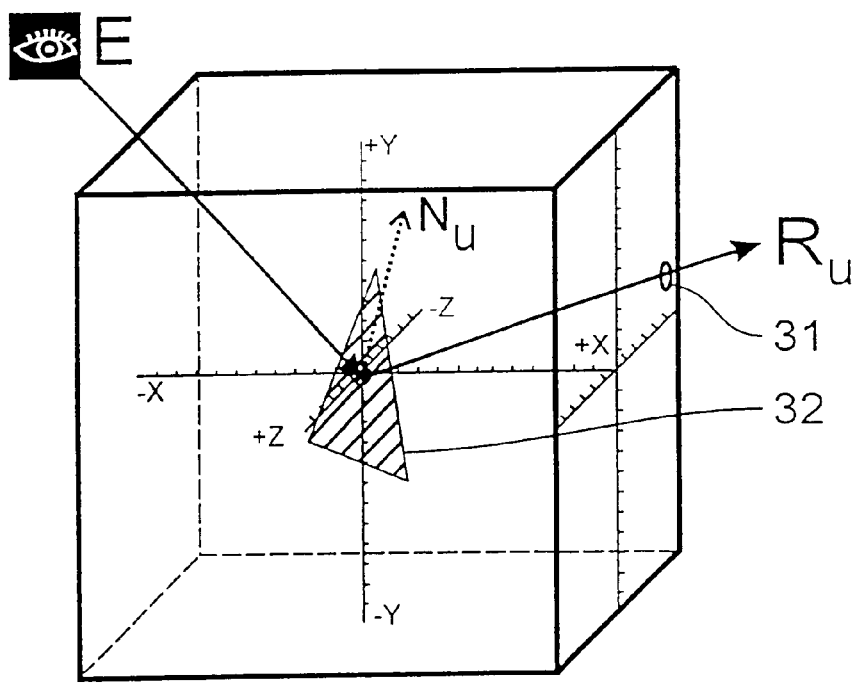

The storage matrices 7 and 8 for calculating the color and/or brightness value of a grid element for a selected object each reproduce a cubical enveloping surface, which surrounds the respective grid element. FIGS. 6a and 6b each show such a cubical enveloping surface. In this case, a color and/or brightness value is coordinated with each surface element of the enveloping surface.

In the case of diffuse reflection (FIG. 6a), the surface element of the cubical enveloping surface which is intersected by the pixel normal or its extension must be determined to calculate the diffuse reflection. The value coordinated with this surface element then represents the diffuse reflection factor.

In the case of specular reflection (FIG. 6b), the specific point of the enveloping surface where the reflection vector or its extension pierces the enveloping surface must be determined to calculate the specular reflection. The value coordinated with this point on the enveloping surface then defines the color or brightness value of the respective grid element during specular reflection.

The values on the enveloping surfaces in storage matrices 7, 8 for an object thus define the illumination environment for the triangle and correspond to an all-around picture of the environment from the perspective of the triangle. It is therefore advantageously possible to take into account the environmental reflections as well as the reflections of other objects. This only requires a precalculation of the storage matrices 7, 8 in a suitable manner. Also, the simulation of optionally distributed light sources is possible. In addition, a viewer can change his/her position optionally, that is move through a setting virtually, wherein the visual perception of the viewer adjusts automatically to the changed perspective.

As already described in the above, the cubical enveloping surface of a triangle is reproduced in each case by one three-dimensional storage matrix from each of the matrices 7 and 8. A first dimension of each storage matrix 7, 8 can accept values of between 1 and 6 and indicates which side surface of the enveloping surface is pierced by the pixel normal (in the case of diffuse reflection) or the reflection vector (in the case of specular reflection). The addressing of the two other dimensions of the storage matrix 7, 8 takes place depending on the position of the intersecting point of the respective side surface. If the pixel normal or the reflection vector pierces, for example, a side surface of the cubical enveloping surface that is parallel to the XZ plane, then the Y coordinate of the intersecting point addresses the second dimension and the Z coordinate of the intersecting point addresses the third dimension of the reflection matrix. The addressing here does not take place directly with space coordinates of the intersecting point, but indirectly through interconnection of one additional arithmetic unit 9 or 10, respectively, which calculates the angle to the coordinate system axis that pierces the side surface in two planes that are at a right angle to each other.

The calculating of the color and/or brightness values for diffuse reflection and specular reflection is explained in detail in the description to FIGS. 6a or 6b.

Thus, a color or brightness value $E_D$ for diffuse reflection and a color or brightness value $E_S$ for specular reflection is read out of the reflection matrices 7, 8, respectively, which represents the visual perception of the viewer by taking into consideration the actual perspective. In addition, the assignment unit 5 provides a texture value t for each grid element, which permits the simulation of a two-dimensional surface structure of the triangle. The two color or brightness values $E_D$, $E_S$, the texture value t and a color value c are fed to a blend-in unit 11 which calculates a brightness value h of the triangular area.

At the output, the circuit then issues the space coordinates x, y, z of the respective grid element and the calculated brightness value h.

The space coordinates x, y, z of the grid element must only be converted to screen coordinates for displaying them on a screen, which can be done, for example, by means of a downstream-connected arithmetic unit through central projection of the spatial setting.

Figure 2B:
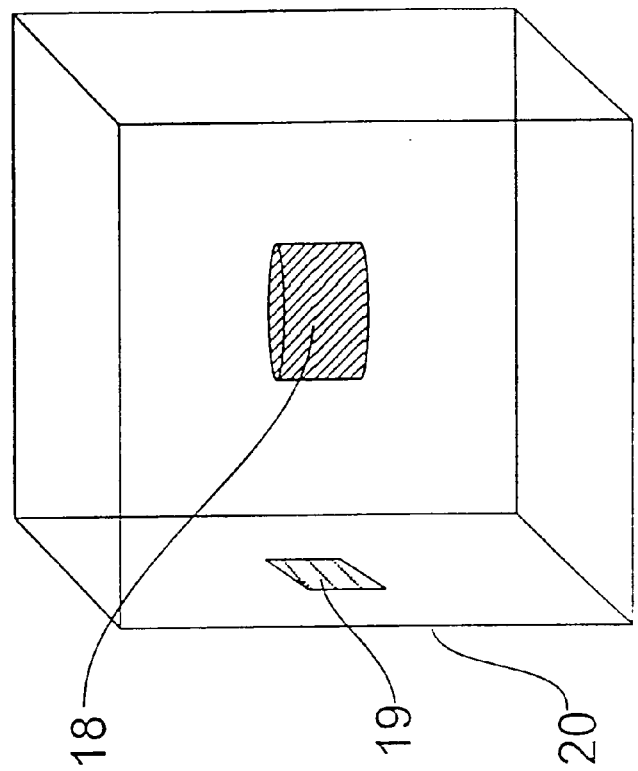
FIGS. 2a and 2b are diagrams of two objects with reflecting surfaces surrounded, respectively, by cubical enveloping surfaces for explaining the calculations of the reflections.
Figure 2A:
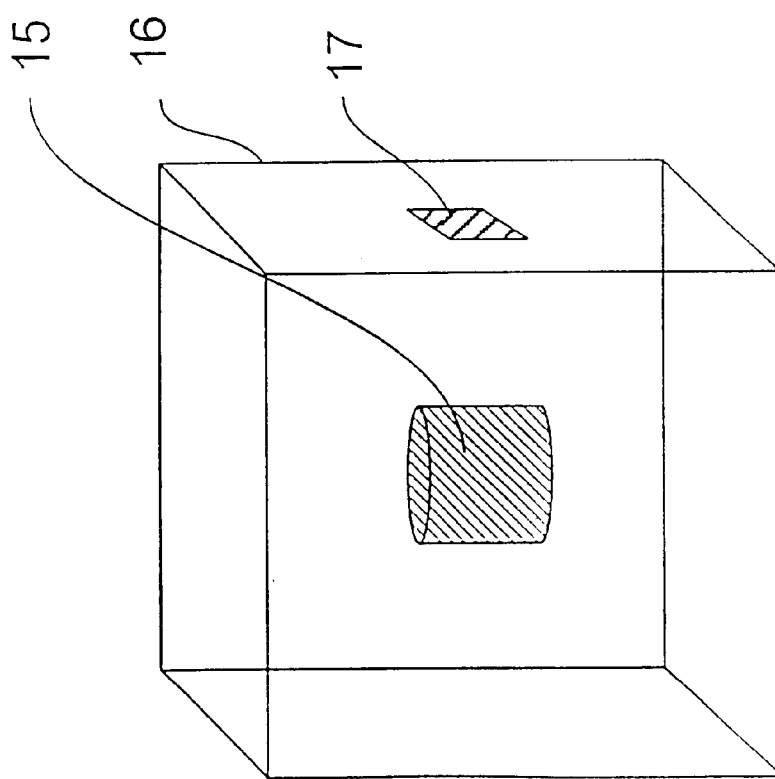

FIGS. 2a and 2b show two objects 15, 18 with reflecting surfaces, which are each surrounded by a cubical enveloping surface 16, 20 that reproduces an all-around picture of the environment of the respective object 15 or 18 and thus makes it possible to take into consideration reflections in the objects 15, 18. A color or brightness value is assigned to each surface element of the enveloping surface 16, 20, which reproduces the image perception of the environment for object 15 or 18 in a specific direction.

For the sake of simplicity, the representation in this case shows only those color or brightness values of the enveloping surfaces 16, 20 which are caused by inter-reflections of the two objects between each other, while the reflections of the "global" environment surrounding the two objects 15, 18 are neglected. In practice, the storage matrices that reproduce the cubical enveloping surfaces 16, 20 show the reflections of the environment in an object as well as the interreflections of the objects 15, 18 between each other in order to achieve as realistic an image perception as possible.

As can be seen from the display, the side surface facing the second object 18 of the enveloping surface 16 that surrounds the first object 15 shows an almost centrally positioned image 17 of the second object 18. In order to calculate the color or brightness distribution on the individual enveloping surfaces 16, 20, the objects 15, 18 thus are respectively projected onto the side surfaces of the enveloping surface coordinated with the other object. Correspondingly, the side surface facing the first object 15 of enveloping surface 20 of the second object 18, shows a nearly central image 19 of the first object 15 as well. When viewing a grid element of the first object 15, the viewer then perceives the second object 18 if the reflection vector that results from the reflection of the "visual ray" at the grid element intersects with the coordinated enveloping surface 16 in the area of the image 17.

Figure 3:
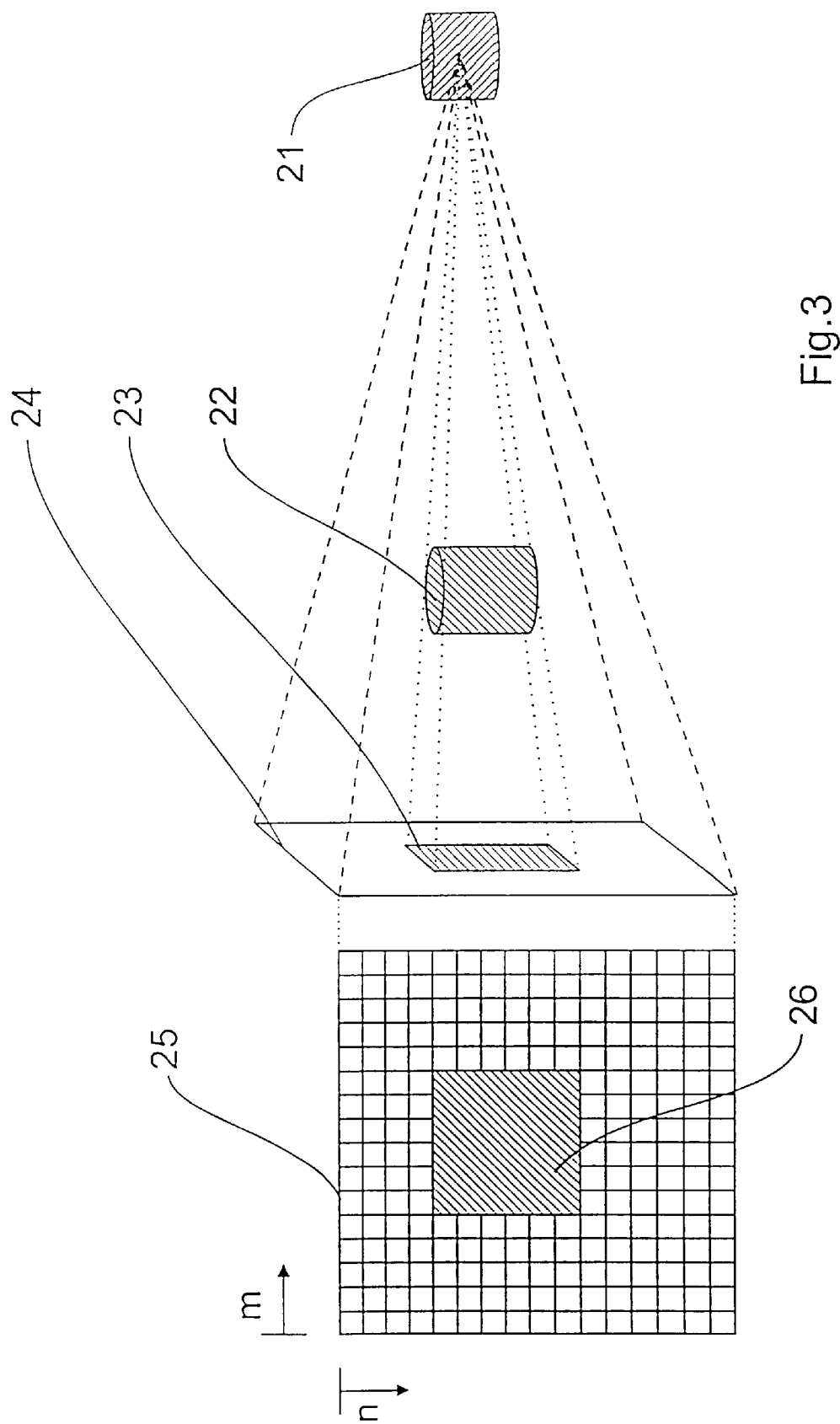
FIG. 3 is a diagram for explaining the calculations of the storage matrices that reproduce the cubical enveloping surfaces.

The calculation of the color or brightness distribution on the enveloping surfaces is shown in detail in FIG. 3 with the aid of two objects 21, 22 with reflecting surfaces. In order to simplify the representation, only the side surface of the enveloping surface surrounding the object 21 is reflected here. This side surface is facing the other object 22 because the other side surfaces already reflect other objects or the "global" environment and are therefore not relevant in this case. As already explained in the above, the enveloping surface surrounding an object reproduces an all-around picture from the perspective of the respective object. The color and/or brightness distribution on the side surface 24 of the enveloping surface, which results from the reflections of the object 22 in the other object 21, is therefore determined through central projection of the object 22 onto the side surface 24 of the enveloping surface, wherein the projection center is located in the center of the other object 21. Furthermore, FIG. 3 shows the area 25 of the storage matrix that reproduces the enveloping surface and which is coordinated with the side surface 24 of the enveloping surface. The representation shows that each memory location of the storage matrix is coordinated with a surface element of the side surface 24 and thus reproduces the color or brightness distribution on the enveloping surface. For reasons of simplicity, the memory locations, which show the image of object 22 on the side surface 24, are shown with uniform hatching. In reality, however, the memory locations of the storage matrix comprise color or brightness values stored in a plurality of gradations, which allows a realistic display of reflections.

FIG. 4 shows the internal configuration of the fourth module or arithmetic unit 4 of FIG. 1. The fourth arithmetic unit 4 essentially comprises six multipliers 27.1 to 27.6 and three adders 28.1 to 28.3, which calculate the local planar normal (pixel normal) for each grid element of the triangle from the tilt components du and dv, the transformation matrix A and the components $n_x$, $n_y$, $n_z$:

$$\begin{bmatrix} n'_x \\ n'_y \\ n'_z \end{bmatrix} = \begin{bmatrix} n_x \\ n_y \\ n_z \end{bmatrix} + \begin{bmatrix} A_{00} & A_{01} \\ A_{10} & A_{11} \\ A_{20} & A_{21} \end{bmatrix} \cdot \begin{bmatrix} du \\ dv \end{bmatrix}$$

The coefficients $A_{ij}$ of the transformation matrix A and one of the tilt components $\Delta u$ or $\Delta v$ are present for this at the inputs of each of the multipliers 27.1 to 27.6. Together with the components $n_x$, $n_y$, $n_z$ of the planar normal for the triangle, the output signals dxv, dxu, dyv, dyu, dzv, dzu of the multipliers 27.1 to 27.6 are fed to adders 28.1 to 28.3, which use them to calculate the components $n'_x$, $n'_y$, $n'_z$ of the pixel normal.

Figure 5A:
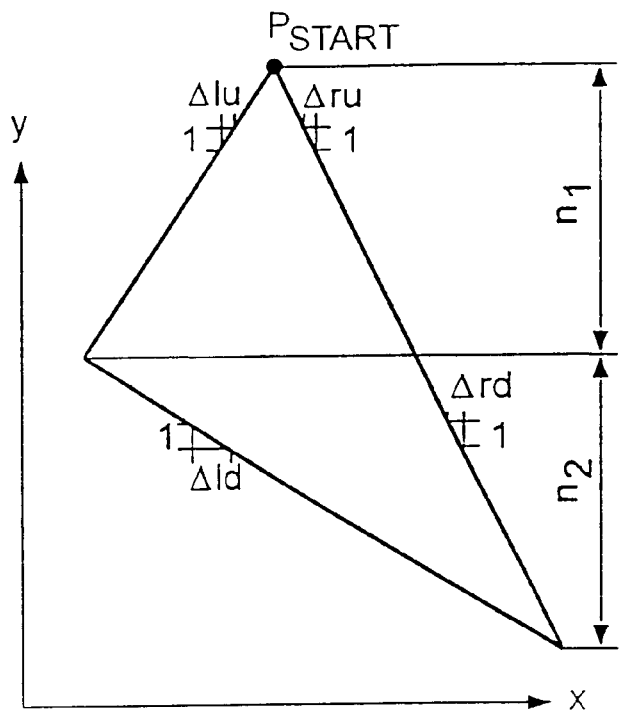
FIGS. 5a and 5b are diagrams showing dividing of a triangular plane into grid elements.
Figure 5B:
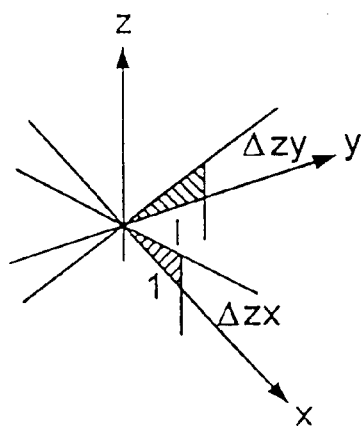

As already mentioned in the description of FIG. 1, the circuit is provided with an input parameter set, which among other things determines the spatial position of the triangle to be displayed. FIGS. 5a and 5b show the significance of these parameters with the aid of an example.

The input parameter set comprises, among other things, the space coordinates $x_s$, $y_s$, $z_s$ of a corner point $P_{start}$ of the triangle. This corner point serves as the starting point and defines the position of the triangle in space, while the border increments $\Delta lu$, $\Delta ru$, $\Delta ld$, $\Delta rd$ define the shape of the triangle as well as the position of the triangle relative to the coordinate axes.

Starting with the starting point $P_{start}$, the triangle is divided into grid lines and each grid line again into grid elements. The individual grid lines here always run parallel to the x-axis. The border increment $\Delta lu$ or $\Delta ld$ defines the slope of the triangle border to the left of the starting point, that is relative to the Y-axis, while the border increment $\Delta ru$ or $\Delta rd$ defines the slope of the triangle border on the right side, relative to the Y-axis. In this way, the space coordinates for the starting and end points of each grid line can be calculated.

Since the grid lines run parallel to the X-axis, the Y-coordinate of the starting point and the end point of each grid line results from the Y-coordinate $y_s$ of the starting point and the number of grid lines:

$$y_l = y_s + i \quad y_r = y_s + i$$

The X-coordinate $x_1$ of the starting point of each grid line correspondingly results from the X-coordinate $x_s$ of the starting point $P_{start}$, the number i of the grid line as well as the border increment $\Delta lu$ or $\Delta ld$. In this case, the border increment $\Delta lu$ and subsequently the border increment $\Delta ld$ are used within the first grid lines $n_1$.

$$x_1 = x_s + \Delta lu \cdot i \qquad \text{for } i \leq n_1$$
$$x_1 = x_s + \Delta lu \cdot n_1 + (i - n_1) \cdot \Delta ld \quad \text{for } n_1 < i \leq n_1 + n_2$$

In the same way, the X-coordinate $X_r$ of the end point for each grid line results from the X-coordinate $x_s$ of the starting point $P_{start}$, the number i for the grid line as well as the border increment $\Delta ru$ or $\Delta rd$. In this case, the border increment $\Delta ru$ and subsequently the border increment $\Delta rd$ are used during the first $n_1$ grid lines:

$$x_r = x_s + \Delta ru \cdot i \qquad \text{for } i \leq n_1$$
$$x_r = x_s + \Delta ru \cdot n_1 + (i - n_1) \cdot \Delta rd \quad \text{for } n_1 < i \leq n_1 + n_2$$

The Z-coordinate $z_1$ of the starting point results from the Z-coordinate $z_s$ of the starting point, the number for the grid line as well as the tilt positions for the triangle plane relative to the X-axis and the Y-axis:

$$z_1 + z_s + i \cdot \Delta zy + (x_1 - x_s) \cdot \Delta zx$$

The grid lines are then divided into grid elements, wherein the space coordinates are calculated for each grid element from the known coordinates of the starting and end points of the grid lines.

Since the grid lines run parallel to the X-axis, the Y-coordinate for each grid element is equal to the Y-coordinate of the associated grid line:

$$Y_j = Y_1$$

The X-coordinate of each grid element results from the X-coordinate $x_1$ of the starting point for the grid line and the number j of the grid element in the grid line:

$$x_j = x_1 + j$$

The Z-coordinate of a grid element results from the Z-coordinate $z_1$ of the starting point of the associated grid line, the number j of the grid element within the grid line and the tilt $\Delta zx$ of the triangle plane relative to the X-axis.

$$z_j = z_1 + j \cdot \Delta zy$$

In this way, the space coordinates $x_j$, $y_j$, $z_j$ are calculated for each grid element of the triangle plane.

The cube shown in FIG. 6a is used to calculate the color or brightness value of a grid element with diffuse reflection at the grid element. As explained in the above, the light is radiated for the most part uniformly in all directions for diffuse reflection. The brightness of a grid element therefore does not depend on the perspective of the viewer, but is determined exclusively by the position of the pixel normal relative to the illumination environment.

In order to calculate the reflection factor, the cube is positioned in such a way that the actual grid element is located in the center of the cube. Thus, the cube forms an enveloping surface around the grid element, wherein a color or brightness value is coordinated with each surface element of the enveloping surface.

In order to calculate the image perception of a grid element, the intersecting point 29 of the pixel normal $N_U$ with the enveloping surface is subsequently fixed and the associated color or brightness value determined.

The color or brightness values on the enveloping surface thus define the environment of triangle 30 and correspond to an all-around picture of the environment from the perspective of the triangle 30. It is therefore advantageously possible to take into account the reflections of the environment as well as that of other objects. The simulation of optionally distributed light sources is also possible.

In this case, the cube is realized as a 3-dimensional storage matrix, wherein the first dimension of the storage matrix indicates which side surface of the cube is intersected by the pixel normal $N_U$, while the two other dimensions reproduce the position of the point of intersection 29 within the side surface.

It depends only on the ratio of the individual components of the pixel normal $N_U$ which enveloping surface is pierced by the pixel normal $N_U$, meaning the addressing of the first dimension of the storage matrix. If, for example, the X-component has a higher value than the other two components and a value higher than zero, then the pixel normal $N_U$ pierces the side surface of the enveloping surface that is intersected at a right angle by the positive arm of the X-axis, and the first dimension of the storage matrix correspondingly assumes the value 1.

In general, the following rule applies for the addressing value $a_1$ of the first dimension of the storage matrix, depending on the components $n'_x$, $n'_y$, $n'_z$ of the pixel normal $N_U$:

$$a_1 = \begin{cases} 1 & \text{if max } [n'_x, n'_y, n'_z] = n_x > 0 \\ 2 & \text{if max } [n'_x, n'_y, n'_z] = n_x < 0 \\ 3 & \text{if max } [n'_x, n'_y, n'_z] = n_y > 0 \\ 4 & \text{if max } [n'_x, n'_y, n'_z] = n_y < 0 \\ 5 & \text{if max } [n'_x, n'_y, n'_z] = n_z > 0 \\ 6 & \text{if max } [n'_x, n'_y, n'_z] = n_z < 0 \end{cases}$$

The addressing of the two other dimensions $a_2$, $a_3$ of the storage matrix occurs in dependence on the position of the intersecting point 29 on the respective side surface. If the pixel normal, for example, pierces a side surface of the cubical enveloping surface that is parallel to the XZ plane, then the Y-coordinate of the intersecting point addresses the second dimension and the Z-coordinate of the intersecting point the third dimension of the storage matrix.

In general, the following rules apply for addressing the other two dimensions $a_2$, $a_3$ of the storage matrix:

$$a_2 = \begin{cases} \arctan\left(\frac{n'_y}{|n'_x|}\right) & \text{if } a_1 = 1 \text{ or } 2 \\ \arctan\left(\frac{n'_x}{|n'_y|}\right) & \text{if } a_1 = 3 \text{ or } 4 \\ \arctan\left(\frac{n'_x}{|n'_z|}\right) & \text{if } a_1 = 5 \text{ or } 6 \end{cases}$$

$$a_3 = \begin{cases} \arctan\left(\frac{n'_z}{|n'_x|}\right) & \text{if } a_1 = 1 \text{ or } 2 \\ \arctan\left(\frac{n'_z}{|n'_y|}\right) & \text{if } a_1 = 3 \text{ or } 4 \\ \arctan\left(\frac{n'_y}{|n'_z|}\right) & \text{if } a_1 = 5 \text{ or } 6 \end{cases}$$

FIG. 6b shows another cube, which serves to calculate the color or brightness value of a grid element during the specular reflection.

The specular reflection at a surface does not result in a uniform reflection in all directions, as was assumed for the above-described diffuse reflection, but is in one preferred light-reflecting direction.

Based on the laws of geometrical optics, this light reflecting direction results from the position of the planar normal and the light incidence direction. A ray of light emanating from a light source thus hits the surface and is reflected by it in the light reflecting direction R, wherein the angle of incidence and the angle of reflection relative to the planar normal are the same. If, reversely, not the light ray emitted by the light source is viewed, but a "visual ray" originating with the viewer, then this "visual ray" is reflected at the surface based on the same laws and subsequently hits an object in the environment. In this way, it can be determined which segment of the environment a viewer perceives during the specular reflection at a grid element.

Depending on the viewing direction E and the position of the pixel normal $N_U$, a reflection vector $R_U$ is calculated for this, which corresponds to the "visual ray" reflected at the grid element. Since the angle of incidence and the angle of reflection are the same for the specular-type reflection, the reflection vector $R_U$ results from the pixel normal $N_U$ and the viewing vector E:

$$\vec{R}_U = 2 \cdot \vec{N}_U \cdot (\vec{N}_U \cdot \vec{E}_U) + \vec{E} \cdot (\vec{N}_U \cdot \vec{N}_U)$$

or written in the component manner of writing:

$$\begin{bmatrix} r_x \\ r_y \\ r_z \end{bmatrix} = 2 \cdot \begin{bmatrix} n'_x \\ n'_y \\ n'_z \end{bmatrix} \cdot (n'_x \cdot e_x + n'_y \cdot e_y + n'_z \cdot e_z) + \begin{bmatrix} e_x \\ e_y \\ e_z \end{bmatrix} \cdot (n'^2_x + n'^2_y + n'^2_z)$$

As for the calculation of the specular reflection, the cube is arranged such that the observed triangle 32 is located in the center of the cube. The cube thus forms an enveloping surface that surrounds the grid element, wherein a color or brightness value is assigned to each surface element of the enveloping surface. Thus, in order to determine the color or brightness value, that surface element of the enveloping surface must be determined, which is pierced by the reflection vector $R_U$ or its extension. The color or brightness value assigned to this surface element then reproduces the image perception of the viewer.

The cubical enveloping surface therefore reproduces an all-around picture of the environment from the perspective of the grid element.

In this case, as for the diffuse reflection, the cube is reproduced with a three-dimensional storage matrix. The first dimension in this case is addressed in dependence on the side surface pierced by the reflection factor. For the addressing value $a_1$ of the first dimension of the storage matrix, the following applies:

$$a_1 = \begin{cases} 1 & \text{if max } [r_x, r_y, r_z] = r_x > 0 \\ 2 & \text{if max } [r_x, r_y, r_z] = r_x < 0 \\ 3 & \text{if max } [r_x, r_y, r_z] = r_y > 0 \\ 4 & \text{if max } [r_x, r_y, r_z] = r_y < 0 \\ 5 & \text{if max } [r_x, r_y, r_z] = r_z > 0 \\ 6 & \text{if max } [r_x, r_y, r_z] = r_z < 0 \end{cases}$$

The addressing of the other two dimensions of the storage matrix occurs in dependence on the position of the intersecting point 31 within the side surface pierced by the reflection vector $R_U$. For the addressing values $a_2$, $a_3$, the following applies:

$$a_2 = \begin{cases} \arctan\left(\frac{r_y}{|r_x|}\right) & \text{if } a_1 = 1 \text{ or } 2 \\ \arctan\left(\frac{r_x}{|r_y|}\right) & \text{if } a_1 = 3 \text{ or } 4 \\ \arctan\left(\frac{r_x}{|r_z|}\right) & \text{if } a_1 = 5 \text{ or } 6 \end{cases}$$

$$a_3 = \begin{cases} \arctan\left(\frac{r_z}{|r_x|}\right) & \text{if } a_1 = 1 \text{ or } 2 \\ \arctan\left(\frac{r_z}{|r_y|}\right) & \text{if } a_1 = 3 \text{ or } 4 \\ \arctan\left(\frac{r_y}{|r_z|}\right) & \text{if } a_1 = 5 \text{ or } 6 \end{cases}$$

The reflection vector for specular reflection is then read out of the storage matrix in dependence on the addressing values $a_1$, $a_2$, $a_3$ and is entered together with the reflection vector for diffuse reflection and the texture value t for the grid element into the calculation for the brightness of the grid element.

It is advantageous here that the perspective of the viewer can be changed without having to recalculate the storage matrix. Thus, the viewer can change his/her perspective in a real-time rendering relative to the spatial setting to be displayed and consequently can "walk through" the setting.

Figure 7:
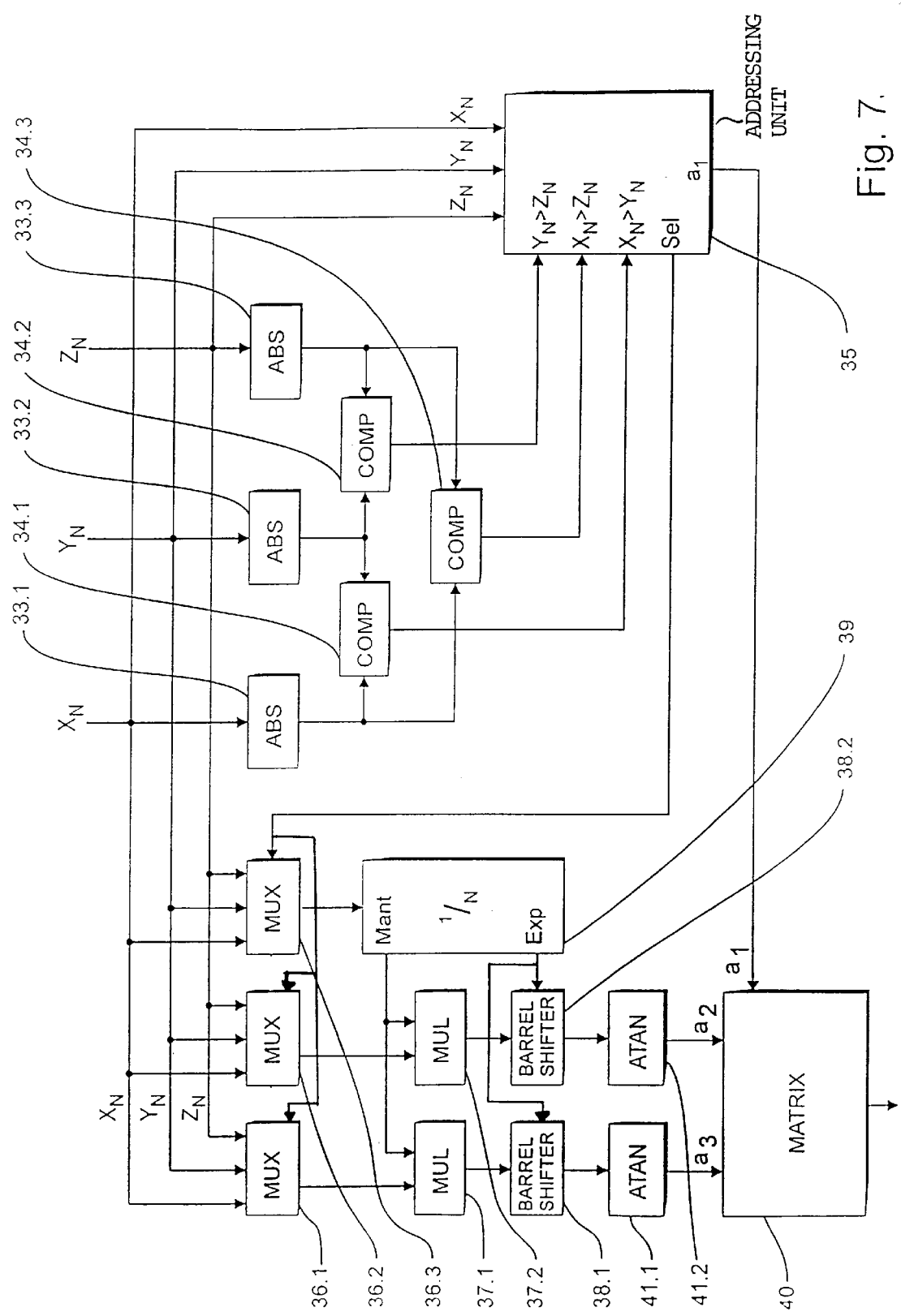
FIG. 7 is a block circuit for reproducing the cubical enveloping surfaces shown in FIGS. 6a and 6b.

FIG. 7 shows a block diagram of a circuit for addressing a 3-dimensional storage matrix with a vector, wherein the 3-dimensional matrix reproduces a cubical enveloping surface that surrounds the origin of the vector. The circuit shown thus is suitable for calculating the color or brightness values for diffuse reflection or specular reflection with the cubes shown in FIGS. 6a or 6b.

In addition, the circuit can be used for all those cases where a vector addresses a 3-dimensional storage matrix, which reproduces a cubical enveloping surface, for example in FIG. 1 in place of addressing unit 6, arithmetic unit 9 or 10 and matrices 7 or 8.

At the input, the circuit receives the space coordinates $x_N$, $y_N$, $z_N$ of the addressing vector. The circuit initially determines which side surface of the cubical enveloping surface is intersected by the vector. The addressing vector space coordinate with the highest vector is determined for this. If, for example, the X-coordinate of the vector has the highest value, then the vector intersects with the side surface of the cubical enveloping surface that runs parallel to the YZ plane.

The space coordinates $x_N$, $y_N$, $z_N$ are therefore initially fed to one of the arithmetic unit 33.1, 33.2 or 33.3, which form the absolute value for the space coordinates. Subsequently, the absolute values for the space coordinates, that is the output signals for the arithmetic units 33.1, 33.2 and 33.3, are then supplied in pairs to three comparators 34.1, 34.2, 34.3, which compare the absolute values for the space coordinates.

The output signals from the comparators 34.1, 34.2, 34.2 are subsequently supplied to an addressing unit 35, which calculates the addressing value $a_1$ for the first dimension of the 3-dimensional matrix 40. For this, the addressing unit 35 compares the output signals from the comparators 34.1, 34.2, 34.3 and calculates from this and from the digit signs of the space coordinates the addressing value $a_1$ based on the following rule:

$$a_1 = \begin{cases} 1 & \text{if } x_N \geq y_N \wedge x_N \geq z_N \wedge x_N \geq 0 \\ 2 & \text{if } x_N \geq y_N \wedge x_N \geq z_N \wedge x_N < 0 \\ 3 & \text{if } y_N \geq x_N \wedge y_N \geq z_N \wedge y_N \geq 0 \\ 4 & \text{if } y_N \geq x_N \wedge y_N \geq z_N \wedge y_N < 0 \\ 5 & \text{if } z_N \geq y_N \wedge z_N \geq x_N \wedge z_N \geq 0 \\ 6 & \text{if } z_N \geq y_N \wedge z_N \geq x_N \wedge z_N \geq 0 \end{cases}$$

Furthermore, the circuit determines at which position the addressing vector pierces the side surface of the cubical enveloping surface. The coordinates for this intersecting point serve to address the second and third dimensions of the matrix 40.

For this, the circuit forms the quotients of each space coordinate with the smaller value and the space coordinate with the highest value. The addressing unit 35 therefore generates a selection signal Sel, which is fed to the multiplexers 36.1, 36.2, 36.3.

The multiplexer 36.3 selects the space coordinate with the highest value and feeds its value to the arithmetic unit 39, which forms the reciprocal value from this and reads it out separately as a mantissa and exponent.

The two other multiplexers 36.1, 36.2 respectively select one of the two space coordinates with the lower value as numerators.

Together with the mantissa of the reciprocal value of the space coordinate with the highest value selected by the arithmetic unit 39, the output signals from the multiplexers 36.1, 36.2 are then fed to multipliers 37.1, 37.2, respectively, which multiply the space coordinates with the lower value with the mantissa of the reciprocal value of the space coordinate with the highest value.

The output signal of each of the multipliers 37.1, 37.2 is fed, respectively, to two shift registers 38.1, 38.2, which then perform a multiplication with the exponent calculated by the arithmetic unit 39.

Thus, the following is applicable for the output signals $a_2$, $a_3$ of this addressing logic if $x_N$, for example, is the component with the highest value:

$$a_2 = \frac{y_N}{x_n} \quad a_3 = \frac{z_N}{x_N}$$

The output signals $a_2$, $a_3$ subsequently address the second or third dimension of the matrix 40, which can be realized, for example, as a semiconductor memory.

Figure 8:
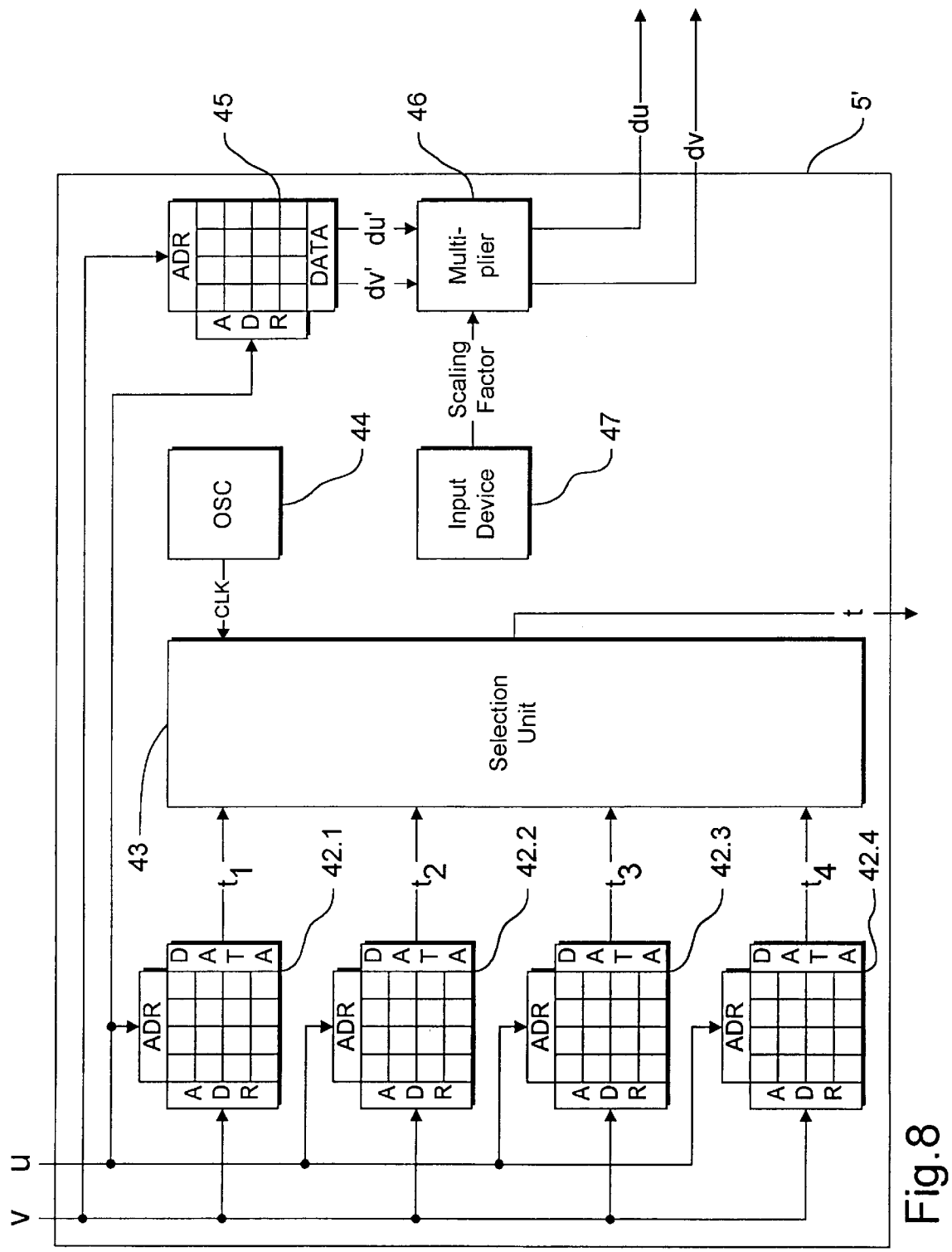
FIGS. 8 and 9 are block circuits of further embodiments of the assignment unit shown in FIG. 1.

Referring now to FIG. 8 there is shown another embodiment of the assignment unit 5' shown in FIG. 1. As already described above the assignment unit 5' receives the u,v coordinates for each grid element from the third module 3 and assigns a depth value (du, dv) that defines the depth structure of the surface and a texture value t, which defines the surface texture.

In this embodiment the assignment unit 5' simulates a dynamically changing texture pattern on the surface and has four storage matrices 42.1, . . . , 42.4 each defining a different snapshot of the same flat texture pattern. These storage matrices 42.1, . . . , 42.4 are addressed by the u,v-coordinates of the grid element and the corresponding texture values $t_1, \ldots, t_4$ are fed to a selection unit 43, which selects one of the texture values dependent on a time signal CLK which is generated by an oscillator 44. So the selection unit 43 successively selects the texture values of the different snapshots thereby producing the impression of a moving or dynamically changing texture pattern which makes the simulation more realistic.

It has to be noted that the aforementioned principle of the dynamical simulation of texture patterns can also be used for the dynamical simulation of the environment using different storage matrices each defining one snapshot of the environemt.

As already described above the assignment unit 5' also serves to simulate a depth structure of the surface to make the impression of the object more realistic. For this the assignment unit 5' has another storage matrix 45 that comprises tilt values (du', dv') which reproduce the tilt of the local planar normal corresponding to the surface pattern of the depth structure to be simulated. The storage matrix 45 ist addressed by the u,v-value pair, the same way as the storage matrices 42.1, . . . , 42.4 used for simulation of a flat texture pattern. In this embodiment the tilt values du', dv' that reproduce the surface pattern of the depth structure to be simulated are multiplied with a scaling factor in order to change the spatial depth of the surface structure. For this reason the storage matrix 45 contains the maximum tilt values du', dv' for the local planar normal. These tilt values du', dv' are fed to a multiplier 46 which calculates the tilt values du, dv by multipliing the stored tilt values du', dv'with a scaling factor which can be manually set using an input device 47.

Figure 9:
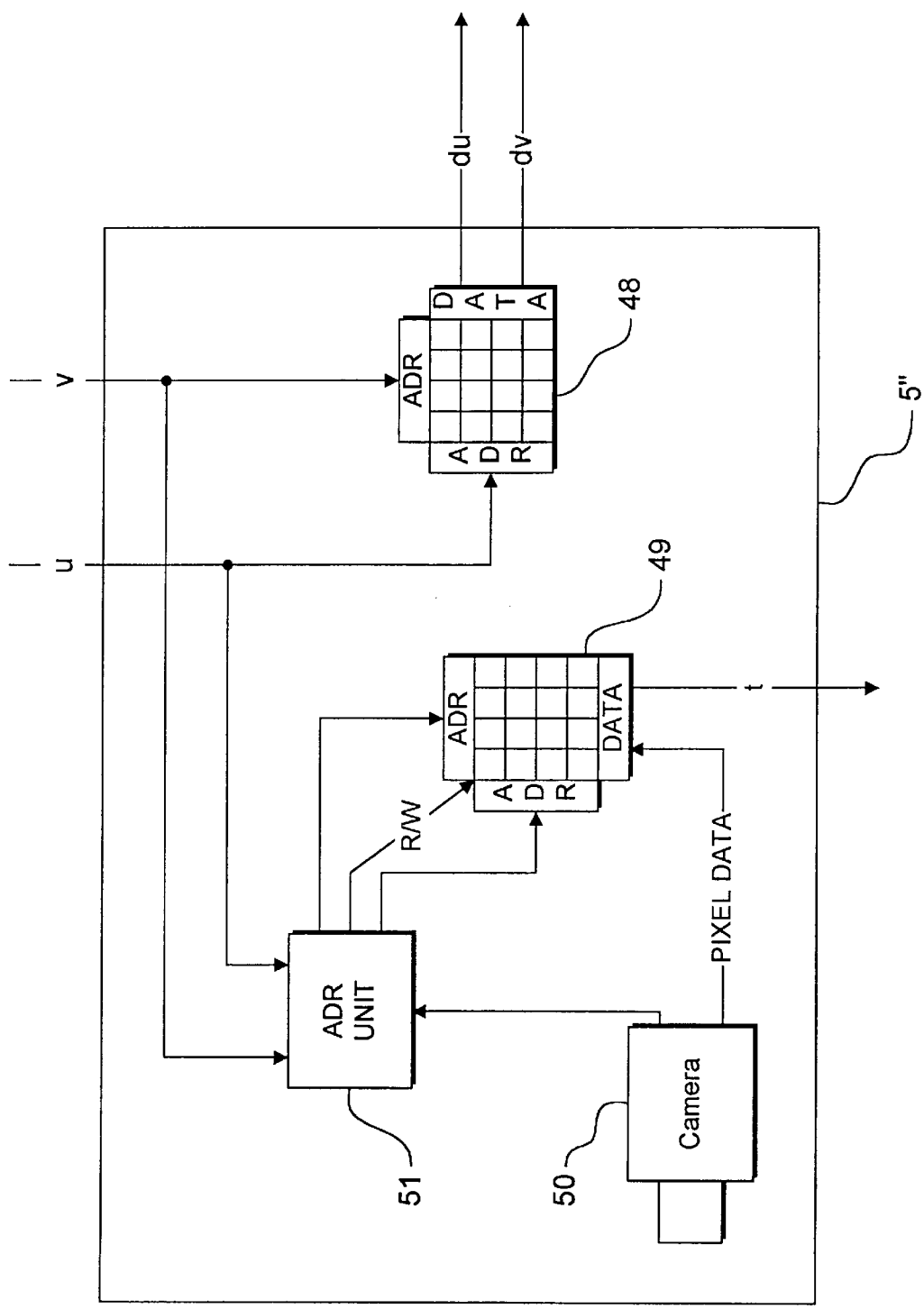

Referring now to FIG. 9 there is shown another embodiment of the assignment unit 5'' shown in FIG. 1. The assignment unit 5'' successively receives the u,v-coordinates for a each grid element and assigns tilt values du, dv for simulating a depth structure as already described above. For this the assignment unit 5'' has a storage matrix 48 which is addressed by the u,v-coordinates of the grid element and contains tilt values du, dv for each grid element.

Further more the assignment unit 5'' has a storage matrix 49 that defines a flat texture pattern to be simulated as already described above. Before simulation the storage matrix 49 has to be initialized by programming the desired texture pattern into the storage matrix 49. For this the assignment unit 5'' has a camera 50 that takes a picture of a desired surface which is stored in the storage matrix 49 and later used as a texture pattern. During the programming period the camera 50 controls an addressing unit 51 to successively address the elements of the storage matrix and additionally to control the storage matrix 49 to operate in the read-mode to receive pixel-data from the camera 50.

During simulation the storage matrix 50 is addressed by the addressing unit 51 that receives the u,v-coordinates of each grid element and controls the storage matrix 49 to operate in the write-mode by setting the read/write-line R/W. In the write-mode the storage matrix 49 outputs the pixel data of the stored texture pattern as a texture value t as already described above.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. An image processing method for displaying objects, wherein each object is composed of at least one polygonal plane represented by a first parameter set that represents the spatial position of the polygonal plane, the method comprising the steps of:

calculating, from the first parameter set for each object, a second parameter set $(n_x, n_y, n_z)$ representing the spatial position of a planar normal of the polygonal plane;

calculating, from the second parameter set and a third parameter set $(e_x, e_y, e_z)$ representing a perspective of a viewer of the polygonal plane, a fourth parameter set representing a spatial position of a light ray reaching the viewer after being reflected at the polygonal plane;

determining at least one of brightness and color perception of an object, taking into consideration reflections of the environment and other objects, by coordinating one 3-dimensional storage matrix for diffuse reflection with each object that represents an enveloping surface surrounding the respective object and includes image information values representing at least one of brightness and color perception of the environment surrounding the object from a perspective of the object and caused by diffuse reflection, and one 3-dimensional storage matrix for specular reflection with each object that represents an enveloping surface surrounding the respective object and includes image information values representing at least one of brightness and color perception of the environment surrounding the object from a perspective of the object and caused by specular reflection;

selecting the 3-dimensional matrices for diffuse reflection and specular reflection coordinated with an object in dependence on a selection value calculated from the first parameter set that represents the spatial position of the polygonal plane; and addressing the selected storage matrices using the fourth parameter set for reading out the image information values from the selected storage matrices.

2. The image processing method according to claim 1, wherein each polygonal plane is comprised of grid elements, the method further including the steps of: calculating, from the first parameter set representing the spatial position of the polygonal plane, a plurality of coordinate sets (x, y, z) representing the respective positions of the grid elements for the polygonal plane; and calculating, from the second parameter set $(n_x, n_y, n_z)$ and the coordinate sets (x, y, z) for the respective grid elements, a parameter set $(n'_x, n'_y, n'_z)$ representing the spatial position of local planar normals for the respective grid elements of the polygonal plane.

3. The image processing method according to claim 2, wherein the polygonal plane is curved and the first parameter set represents the spatial position of corner point normals of the polygonal plane, and the step of calculating the local planar normals includes calculating the local planar normals through interpolation of the corner normals of the polygonal plane and the coordinate set for the respective grid element.

4. The image processing method according to claim 2, and further including:

providing a depth matrix of tilt values representing a tilt of the local planar normal of the respective grid elements relative to the planar normal for the polygonal plane and corresponding to the depth structure to be simulated; and addressing a memory location of the depth matrix of depth values using a respective one of the coordinate sets (x, y, z) for reading out the respective depth values; wherein the step of calculating the parameter set $(n'_x, n'_y, n_{40\ z})$ for local planar normals includes calculating the local planar normal for each one of the coordinate sets (x, y, z) from the second parameter set and the tilt values for the respective grid elements read out of the depth matrix in order to simulate a depth structure for the polygonal plane.

5. The image processing method according to claim 4, further including the step of multiplying the tilt values with a predetermined scaling factor for scaling the depth structure prior to calculating the parameter set $(n'_x, n'_y, n'_z)$ representing the spatial position of the local planar normal.

6. The image processing method according to claim 2, and further including:

providing a texture matrix of texture values representing a texture of the polygonal plane; and addressing a memory location of the texture matrix of texture values using a respective one of the coordinate sets (x, y, z) for each grid element of the polygonal plane for reading out the respective texture values; and merging the texture values with the respective image information values to simulate a partially reflecting polygonal plane.

7. The image processing method according to claim 1, and further including the steps of:

assigning a plurality of storage matrices to each object which respectively represent an enveloping surface surrounding the object and comprise a snapshot of at least one of the brightness and color perception of the environment of the object from the perspective of the object; and successively selecting the plurality of storage matrices for each object to generate a perception of movement.

8. The image processing method according to claim 1, wherein the polygonal plane is triangular.

9. An image processing arrangement for displaying objects, wherein each object is composed of at least one polygonal plane represented by a first parameter set that represents the spatial position of the polygonal plane, comprising:

means for calculating, from the first parameter set for each object, a second parameter set $(n_x, n_y, n_z)$ representing a spatial position of a planar normal of the polygonal plane;

means for calculating, from the second parameter set and a predetermined third parameter set $(e_x, e_y, e_z)$ representing a perspective of a viewer of the polygonal plane, a fourth parameter set representing a spatial position of a light ray reaching the viewer after being reflected at the polygonal plane;

a first plurality of 3-dimensional storage matrices, each matrix of the first plurality representing an enveloping surface surrounding a respective one of the objects and including image information values representing at least one of brightness and color perception of the environment surrounding the object from a perspective of the object and caused by diffuse reflection;

a second plurality of 3-dimensional storage matrices, each matrix of the second plurality representing an enveloping surface surrounding a respective one of the objects and including image information values representing at least one of brightness and color perception of the environment surrounding the object from a perspective of the object and caused by specular reflection;

means for selecting the 3-dimensional matrix for diffuse reflection and the 3-dimensional matrix for specular reflection assigned to an object in dependence on a selection value calculated from the first parameter set that represents the spatial position of the polygonal plane; and means for addressing the selected storage matrices using the fourth parameter set for reading out the image information values from the selected storage matrices.

10. The image processing arrangement according to claim 9, wherein each 3-dimensional storage matrix has memory locations, each of which memory locations reproduces an image perception of the environment of the object from the perspective of the object.

11. The image processing arrangement according to claim 9, wherein each of the polygonal planes is comprised of grid elements, and the arrangement further includes means for calculating, from the first parameter set representing the spatial position of the polygonal plane, a plurality of coordinate sets (x, y, z), each of which sets represents a respective one of the positions of the grid elements for the polygonal plane.

12. The image processing arrangement according to claim 11, and further including: a depth storage matrix having memory locations, each memory location in the depth storage matrix being assigned to a respective one of the grid elements of the polygonal plane and comprising a tilt value which defines the tilt of the local planar normal corresponding to a surface pattern of the depth structure to be simulated; and second addressing means for addressing the depth storage matrix for simulating a depth structure of the polygonal plane.

13. The image processing arrangement according to claim 12, and further including a multiplier connected in series after the depth structure storage matrix to scale the depth structure.

14. The image processing arrangement according to claim 11, and further including a texture storage matrix for simulating a texture of a polygonal plane, wherein each memory location in the texture storage matrix is assigned to a respective one of the grid elements of the polygonal plane and comprises a texture value corresponding to a texture image to be simulated; and a second addressing means for addressing the texture storage matrix with the coordinate sets (x, y, z) of the individual grid elements.

15. Image processing arrangement according to claim 14, and further including a video or computer graphics system connected to the texture storage matrix for dynamic texture simulation.

16. Image processing arrangement according to claim 14, wherein the texture storage matrix comprises a plurality of texture storage matrices assigned to each object for dynamic texture simulation, each texture storage matrix comprising a snapshot of at least one of color and brightness values for the texture image to be simulated; and the arrangement further including second selection means for sequentially selecting each of the additional storage matrices assigned to the object for generating a perception of movement.

17. The image processing arrangement according to claim 9, wherein each of the diffuse and specular matrices assigned to each object comprise a plurality of storage matrices which respectively represent an enveloping surface surrounding the object and comprise a snapshot of at least one of brightness and color perception of the environment of the object from the perspective of the object; and the arrangement further comprises means for successively selecting the plurality of diffuse and specular storage matrices for each object to generate a perception of movement.

18. The image processing method according to claim 1, wherein said image information values are predetermined and stored in said 3-dimensional storage matrices.

19. The image processing method according to claim 9, wherein said image information values are predetermined and stored in said 3-dimensional storage matrices.

* * * * *